Patented Aug. 12, 1952

2,606,929

UNITED STATES PATENT OFFICE 2,606,929

ALCOHOL-METHYLOL-PHENYL ETHER REACTION PRODUCTS

Robert W. Martin, Lenox, Mass., assignor to General Electric Company, a corporation of New York No Drawing. Application January 4, 1951, Serial No. 204,468

11 Claims. (Cl. 260—570.7)

This application is a continuation-in-part of my earlier filed application Serial No. 122,128, filed October 18, 1949, now Patent Number 2,579,329, and assigned to the same assignee as the present invention.

This invention is concerned with novel compositions of matter. More particularly, the invention relates to reaction products of a mixture of ingredients comprising (1) a methylol phenyl ether corresponding to the general formula

I

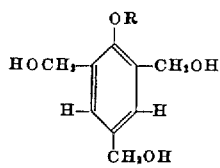

where R represents a member selected from the class consisting of aliphatic, cycloaliphatic, and aryl-substituted aliphatic groups, including halogen-substituted derivatives of the aforesaid aliphatic groups, and (2) an alcohol corresponding to general formula

II            R'OH (which for brevity will hereinafter be referred to as the "alcohol") where R' represents a member of the class consisting of aliphatic, hydroxyaliphatic, cycloaliphatic, aryl-substituted aliphatic, halogen-substituted aliphatic, and amino-substituted aliphatic radicals. The invention also includes reaction products of a mixture of ingredients comprising (1) a methylol phenyl ether corresponding to the general formula

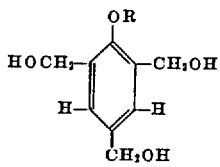

(2) a methylol phenyl ether corresponding to general formula

III

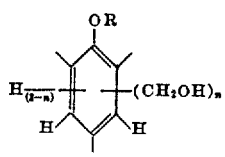

where R has the meaning given above, and $n$ is an integer equal to 1 to 2, inclusive, and where compound (1) is preferably in an amount equal to at least 50% by weight, but may be present in an amount ranging, for example, from 10 to 90%, by weight, or more, and (3) an alcohol corresponding to general formula

R'OH where R' has the meaning given above.

Among the groups which R in the above formula may represent are, for instance, alkyl groups, e. g., methyl, ethyl, propyl, isopropyl, butyl, etc.; unsaturated aliphatic groups, e. g., vinyl, allyl, methallyl, cyclopentenyl, cyclohexenyl, etc.; cyclohexanyl, cyclopentanyl, etc.; aryl-substituted aliphatic (aralkyl), for instance, benzyl, etc.; styryl, etc.; as well as halogenated derivatives of the aforementioned aliphatic groups, for example, the aforementioned groups containing chlorine, bromine, fluorine, or iodine, either on the aliphatic or aromatic grouping, and either monohalogenated or polyhalogenated, for example, containing from two or more halogens, for instance, chlorine, etc., in the organic groups.

R', in addition to being the aliphatic, cycloaliphatic, and aryl-substituted aliphatic groups mentioned above, may also be, for example, hydroxy aliphatic, for instance, hydroxyethyl, hydroxypropyl, hydroxybutyl, hydroxyisobutyl, etc.; halogenoaliphatic, for instance, chloroethyl, chloropropyl, fluoroethyl, bromobutyl, chloroisopropyl, etc.; amino-aliphatic, for instance, aminoethyl, aminopropyl, aminobutyl, etc.

The reaction appears for the most part to go in accordance with the following equation assuming substitution of all three methylol groups:

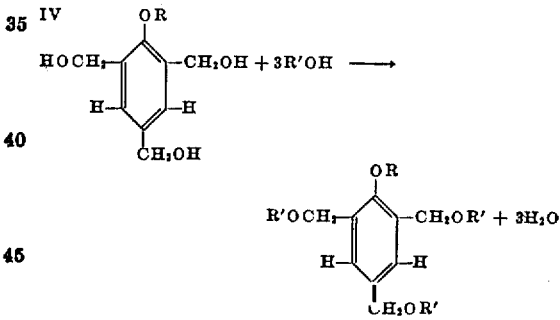

From the above equation it is apparent that the methylol phenyl ether is preformed and thereafter the alcohol is added thereto and caused to react to give the desired methylol phenyl ether derivative. It is desired to point out that the reaction is a stepwise reaction and that it is possible to react one, two, or three of the methylol groups with the alcohol. The extent of reaction will depend in many instances on the reactivity of the alcohol and the duration of the reaction. Alcohols such as ethylene chlorohydrin and ethanolamine are highly reactive, while ethylene glycol and allyl alcohol are somewhat slower to react.

In the following examples, methods are disclosed for preparing the sodium and barium salts of trimethylol phenol which can then be reacted with the appropriate ether-forming ingredient to give the methylol phenyl ether described above in Formula I. The methylol phenyl ether thus obtained, or mixture of ethers which correspond to Formulas I and III, may then in turn be reacted with the alcohol defined by Formula II.

The sodium and barium salts of trimethylol phenol may be formed and isolated as crystalline compounds. More particularly, the crystalline sodium and barium salts of trimethylol phenol may be prepared by effecting reaction between about three mols of formaldehyde and one mol of phenol in the presence of about one mol of alkali such as the hydroxides of sodium and barium at a temperature such that no resinous material is formed. This temperature has been found to range up to about 65° C. above which temperature undesired side reactions take place. The salt of trimethylol phenol can then be precipitated by diluting or pouring the reaction mixture into a suitable water-miscible solvent and separated from the liquid by filtration, decantation or other suitable means.

While the example above calls for molar quantities of alkali, only catalytic quantities of alkali, for example, about one per cent by weight, are required for the phenol-formaldehyde reaction. It will be seen therefore that phenol and formaldehyde may be allowed to react to form the trimethylol compound in the presence of a small amount of alkali at which time the rest of the alkali may be added to form the salt.

Many solvents are suitable for precipitating the salts of trimethylol phenol, e. g., methanol, ethanol, n-propanol, isopropanol, tertiary butanol, secondary butanol, isobutanol, n-butanol, tertiary amyl alcohol, allyl alcohol, diacetone alcohol, butyl carbitol, pyridine, 2-(2'-hydroxyethyl)pyridine, phenyl cellosolve, acetone, acetonitrile, propionitrile, morpholine, diethylenetriamine, methylal, dimethyl cellosolve, dioxane, etc. In general alcohols with no more than four carbon atoms are the most efficient precipitating agents and particularly those with two or three carbon atoms. The preferred precipitating agents are ethanol, propanol, isopropanol and acetone. Of these, ethanol is most suitable from the point of view of low cost, availability and purity of the product obtained. Mixtures of the above precipitating agents also have been found to be very useful. Among the mixtures which are suitable are, by volume, 50–50 n-butanol and methanol, 50–50 methanol and acetone and 50–50 n-amyl alcohol and methanol.

The only metal hydroxides found to be suitable for the preparation of salts of 2,4,6-tris-(hydroxymethyl)phenols or trimethylol phenols are sodium and barium hydroxides. While formaldehyde is mentioned above, equivalent amounts of para-formaldehyde may be used.

The following examples illustrate the preparation of the sodium and barium salts of trimethylol phenol or 2,4,6-tris(hydroxymethyl)-phenol:

*Example I*

To 188 parts by weight (2 mols) of phenol were added 90 parts by weight (2.25 mols) of sodium hydroxide which had been previously dissolved in seventy parts by weight of water. The mixture was cooled and allowed to crystallize; 588 parts by weight (7.3 mols) of formalin (37.2% by weight formaldehyde) were added and the mixture stirred. The temperature of the reaction mixture rose spontaneously to a maximum of 45° C. and then dropped slowly. The mixture was kept at room temperature fifteen to twenty hours, dehydrated under vacuum with heat until the temperature in the flask rose to 45° C. and poured into several times its volume of ethanol. After 3–4 hours the resultant sodium methylol phenate precipitate was filtered and dried.

Theoretical yield—412 parts by weight
Actual yield—335 parts by weight or 81.3% of theory

*Example II*

Formalin in the amount of 140 parts by weight (7.73 mols), forty-seven parts by weight (0.5 mol) of phenol and forty-seven parts by weight (0.55 equivalent) anhydrous barium hydroxide dissolved in seventy-five parts by weight of hot water were mixed in that order. The reaction mixture was kept at a temperature of 30° C. or lower for two hours. The mixture was allowed to react for twenty-four hours at room temperature. Ethanol in the amount of 1600 parts by weight was added with vigorous mechanical stirring. The resulting barium trimethylol phenate precipitate, after standing a few hours, was filtered off, washed with acetone and dried in a vacuum desiccator.

Theoretical yield—125.8 parts by weight
Actual yield—97.9 parts by weight or 77.8% of theory

*Example III*

To 76.2 parts by weight (0.945 mol) of formalin were added while stirring 23.5 parts by weight (0.25 mol) of phenol and twelve parts by weight (0.33 mol) of sodium hydroxide, dissolved in fifteen parts by weight of water. The temperature of the reaction mixture was held at 30° C. or less for two hours. The mixture was put in an oven for twenty-two hours at a temperature of 40° C. Next, 804 parts by weight of n-propanol was poured into the reaction mixture and the mix stirred. The resulting sodium trimethylol phenate precipitate was filtered off, washed with acetone and ether and dried in a vacuum desiccator.

Theoretical yield—51.5 parts by weight
Actual yield—50.8 parts by weight or 98% of theory Other methods for making the sodium and barium salts of symmetrical trimethylol phenol are more specifically disclosed in my aforementioned copending application Serial No. 122,128. The latter application also discloses steps taken to identify the salts formed as being actually the one claimed to have been obtained.

It is to be noted that, consistent with the rules of orientation, only those phenols possessing free reactive hydrogen atoms in all three positions ortho and para to the phenolic hydroxyl group can form trimethylol compounds, e. g. phenol, m-cresol and 3,5-xylenol. However, from actual experiment, it has been found that 3,5-xylenol forms a product in which the salts of uni- and bis(hydroxymethyl) - compounds predominate along with resinous products. No evidence has been obtained of the formation of the salt of the tris(hydroxymethyl) - compound. When m-cresol is used only low yields of the salts of tris(hydroxymethyl)-compound can be obtained due to the fact that the resins are readily formed. From the examples given above, it will also be noted that the reaction may be carried out at various temperatures, the lower temperatures ranging at around 0° C. requiring a reaction time of several days while the reaction at temperatures around 60° C. takes place in several hours. However, temperatures of over 65° C. will cause undesirable side reaction.

The sodium and barium 2,4,6-tris(hydroxymethyl)phenates may be reacted with other compounds to provide a class of primary polyhydric alcohols with a wide range of applications in the chemical, plastics and coating arts. Notable among such compounds are the ethers formed by the etherification of the phenolic hydroxyl groups. Such etherification considerably retards the tendency of the tris(hydroxymethyl)-compound to resinify and hence makes it available for a number of other reactions and applications not possible with sodium tris(hydroxymethyl)phenol.

The ethers prepared from the sodium and barium 2,4,6-tris(hydroxymethyl)phenates may be represented by the general formula:

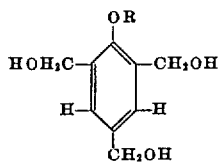

where R has the meaning given previously. The following examples illustrate the preparation of these types of compounds.

Example IV

A mixture of 139 parts by weight of sodium 2,4,6-tris(hydroxymethyl)phenate, 126 parts by weight of methyl iodide and 440 parts by weight of methanol was divided equally between three bottles. The bottles were sealed and placed in an oven at 65° C. for about fifteen to twenty hours. The bottles were cooled and opened. The methanol was boiled off and the products were dissolved in amyl alcohol. The amyl alcohol solution was washed with an aqueous solution of sodium carbonate. The amyl alcohol was distilled off under vacuum. The product, 1-methoxy-2,4,6-tris(hydroxymethyl)benzene was a viscous light brown syrup.

Yield=118 parts by weight. Theory=134 parts by weight
Methoxyl content=15.33%, 15.70%
Theory=15.66%

Example V

To 210 parts by weight of sodium 2,4,6-tris-(hydroxymethyl)phenate was added a solution of 130 parts by weight of allyl bromide in 475 parts by weight of methanol. The mixture was refluxed with stirring for two hours. The methanol was distilled off under vacuum and amyl alcohol added. The amyl alcohol solution was washed with a solution of saturated sodium carbonate-potassium chloride and was dried over anhydrous sodium sulphate. The amyl alcohol was removed under vacuum. The product, 1-allyloxy-2,4,6-tris(hydroxymethyl)benzene, was a brown syrup.

Yield=140 parts by weight. Theory=224.

Example VI

Forty-two parts by weight of the sodium 2,4,6-tris(hydroxymethyl)phenate was placed in a bottle with forty parts by volume of a 2.5 per cent solution of sodium hydroxide. 26.6 parts by weight of benzyl chloride was added as well as thirty-two parts by weight of methanol. The reaction ingredients were shaken at 55° C. for forty-eight hours. The cooled contents of the bottle were poured into 200-300 parts by weight of hot water, heated for ten to fifteen minutes and stirred. When stirring was stopped, the product separated out as an oily layer. The washed product was dissolved in acetone, filtered, and the water and acetone distilled off. The product, 1-benzyloxy-2,4,6-tris(hydroxymethyl)-benzene, was a brown syrup. The theoretical yield was 54.8 parts by weight, as compared to the actual yield of 38.92 parts by weight or a 71 per cent yield.

Example VII

Example VI was repeated using nineteen parts by weight of 2-methallyl chloride in place of the benzyl chloride. The methanol which had been added in Example VI to increase the solubility of the benzyl chloride in the reaction mixture was not employed. The product, 1-(2'-methallyloxy)-2,4,6-tris(hydroxymethyl)benzene, was a very viscous, almost solid brown syrup. The actual yield was 32.92 parts by weight as compared with the theoretical 47.6 parts by weight or a 69 per cent yield.

Example VIII

Example VI was again repeated using 23.3 parts by weight 2,3-dichloropropene-1 in lieu of the benzyl chloride. Methanol was not used. The product, 1-(2'-chloroallyloxy)-2,4,6-tris(hydroxymethyl)benzene was a viscous brown syrup. The yield of 44.52 parts by weight was 86 per cent of the theoretical value of 51.7 parts by weight.

Example IX

Example VI was repeated using 23.3 parts by weight of 1,3-dichloropropene-1 in place of benzyl chloride and without the use of methanol. The 1-(3'-chloroallyloxy)-2,4,6-tris(hydroxymethyl)benzene was a viscous brown syrup. The yield was 40.82 parts by weight or 79 per cent of the theoretical value of 51.7 grams.

Example X

Example VI was repeated using 41.6 parts by weight of isoamyl iodide in place of benzyl chloride and with forty parts by weight of methanol. The product yield was 9.19 parts by weight as against a theoretical 50.8 parts by weight or 18 per cent. The 1-isoamyloxy-2,4,6-tris-(hydroxymethyl)-benzene was obtained as a viscous brown syrup.

Example XI

Example VI was again repeated using 28.8 parts by weight of n-butyl bromide in place of the benzyl chloride along with forty parts by weight of methanol. The yield of 1-butyloxy-2,4,6-tris(hydroxymethyl)benzene as a viscous brown syrup was 27.85 parts by weight or 57.8% of the theoretical value of forty-eight parts by weight.

Example XII

One hundred and ninety-two parts by weight of the sodium salt of trimethylol phenol was dissolved in water and 49 parts by weight of dimethyl sulphate added. The mixture was stirred for two hours, 71 parts by weight of sodium hydroxide and 92 parts by weight of dimethyl sulphate added and stirring continued for about 12 hours. The temperature of the mixture was then raised to boiling and extracted while hot with n-amyl alcohol. The product, trimethylol anisole, was obtained in a yield of 135 parts by weight, or a 73% of theory.

While ethers of 2,4,6-tris(hydroxymethyl)phenols have been found to be very useful, they are rather expensive to produce in the pure state because of the separation process. It has been found that for many applications, the ethers of the tris(hydroxymethyl)phenols can tolerate varying amounts of the ethers of 2-(hydroxymethyl)phenol, 4-(hydroxymethyl)phenol, 2,6-bis(hydroxymethyl)phenol and 2,4-bis(hydroxymethyl)phenol. In general, if at least 2.5 mols of formaldehyde are used to each mol of phenol, the major proportion of the reaction product will be the tris-(hydroxymethyl) compound. Consequently, the corresponding ether mixture will predominate in the ether of the tris-(hydroxymethyl)phenol. The formula of such mixtures may be represented as follows:

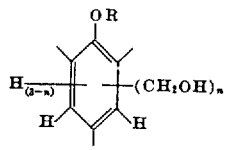

where R represents a member of the class consisting of aliphatic, cycloaliphatic, and aryl-substituted aliphatic groups including their halogen-substituted derivatives, and $n$ is an integer and is at least one but not more than three, and in which the compound in which $n$ is equal to three is preferably though not essentially present in the major proportion (e. g., from 50 to 100 mol per cent). If desired, by proper reaction, proportions, and reaction conditions (e. g., by using molar ratios of formaldehyde below 2.5 to 1 of the phenol), the tris-(hydroxymethyl)phenol may comprise 10 to less than 50, e. g., 40 mol per cent of the mixture of methylol phenols.

Examples illustrating the production of such mixtures of methylol phenol ethers are as follows:

Example XIII

Formalin in the amount of 980 parts by weight (12 mols) of 37.5% solution of formaldehyde was added to 376 parts by weight of phenol and mixed thoroughly. A solution of 176 parts by weight of sodium hydroxide in 200 parts by weight of water was added slowly to the mixture with cooling. The reaction mixture was then placed in an oven at 40° C. for fifteen to twenty hours. Analysis showed that 95.6 per cent of the formaldehyde had reacted. The above phenate solution was placed in a flask equipped with a stirrer. To the solution was added 326.5 parts by weight of allyl chloride and the whole stirred vigorously and heated at 60° C. for about two hours. The etherification reaction ran to about ninety-five per cent of completion.

Example XIV

Three hundred and fifty parts by weight of phenol and 900 parts by weight of 37.3% aqueous formaldehyde were mixed with stirring. To the solution was added 164 parts by weight of sodium hydroxide in 170 parts by weight of water and the whole reacted for six and one-half hours at 40° C. Analysis showed that 86.6 per cent of the formaldehyde had reacted to give about sixty per cent sodium tris(hydroxymethyl)phenate along with the uni- and bis(hydroxymethyl)phenates. Three hundred and three parts by weight of allyl chloride was added and the mixture reacted in a pressure reactor at 60° C. for three hours with vigorous stirring. Analysis showed that 98.7 per cent of the allyl chloride reacted. The aqueous layer was drawn off and the organic layer dehydrated by heating under a vacuum. The yield was 650 parts by weight of the allyl ethers of the mixed uni-, bis- and tris(hydroxymethyl)phenols with the tris compound being present as the major component.

Example XV

Three hundred and thirty-two parts by weight of phenol (96% pure) and 835 parts by weight of a 36.4% aqueous solution of formaldehyde and 160 parts by weight of sodium hydroxide in 167 parts by weight of water were mixed and reacted for seven and one-half hours at 40° C. at which time 83.5 per cent of the formaldehyde had reacted to give a major proportion of sodium tris-(hydroxymethyl)phenate as the product. Allyl chloride in the amount of 273 parts by weight was added and the whole mass heated to 60° C. in an air tight reactor for three and one-half hours with vigorous stirring. At the end of this period 93.1 per cent of the allyl chloride had reacted. The isolated organic layer was dehydrated to yield 625 parts by weight of the allyl ether of mixed uni-, bis-, and tris(hydroxymethyl)phenol with the tris compound as the major component as a brown somewhat viscous oil.

The ethers of the trimethylol phenols may then be reacted with monohydric alcohols corresponding to the formula R'OH where R' has the meaning given above to give new and useful products comprising the subject matter of the present invention.

The hydroxymethyl groups of tris(hydroxymethyl)phenyl ethers react with alcohols to form compounds or compositions having further ether linkages as shown in the previous Equation IV. Since this reaction is a stepwise reaction, reaction of the alcohol with one, two and even three hydroxymethyl groups is theoretically possible. However, except with highly reactive alcohols the reaction usually becomes very slow after one or two hydroxymethyl groups have reacted.

The products formed from such a reaction have many uses. The parent tris-(hydroxymethyl)phenyl ethers do not, as a class, dissolve readily in hydrocarbon solvents. Their use in preparing surface coatings, for example, requires the use of strong polar solvents such as alcohols, ketones, esters, etc., all of which are more expensive than most hydrocarbon solvents, particularly the aliphatic hydrocarbons. However, by effecting partial etherification of the hydroxymethyl groups of tris-(hydroxymethyl)phenyl ethers by refluxing with, e. g., butanol, a product miscible with toluene and other hydrocarbon solvents results.

By reacting the tris-(hydroxymethyl)phenyl ethers with substituted alcohols, such as ethanolamine or ethylene chlorohydrin, an additional functional group can be introduced into the molecule. Products from the reaction of ethylene chlorohydrin with certain tris-(hydroxymethyl)-phenyl ethers have been found to act as plasticizers for polyvinyl chloride.

The following examples disclose illustrative methods for making the claimed compositions of matter.

*Example XVI*

Fifteen parts by weight of 1-allyloxy-2,4,6-tris-(hydroxymethyl)benzene, sixty parts by weight butanol and 0.3 part of concentrated hydrochloric acid were refluxed for two hours. Water and excess butanol were distilled off at atmospheric pressure. The product was a light brown, clear, mobile liquid which was readily soluble in toluene. The hydroxyl content of two samples was 12.65 and 12.82 per cent as compared with a theoretical value of 22.6 per cent for the compound before treatment with butanol. The hydroxyl analysis shows that approximately one hydroxymethyl per molecule of 1-allyloxy-2,4,6-tris-(hydroxymethyl)-benzene has reacted with the butanol.

*Example XVII*

Fifteen parts by weight of 1-(2'-hydroxyethyloxy)-2,4,6-tris(hydroxymethyl)benzene, ninety parts by weight of ethylene chlorohydrin, twenty-two parts by weight of toluene and 0.12 part of concentrated hydrochloric acid were refluxed for three hours. The mixture was filtered and distilled under a vacuum to remove unreacted ethylene chlorohydrin and solvent. The product was a mobile tan liquid soluble in toluene and similar solvents. Chlorine content, 25.79, 25.76 per cent; chlorine content calculated for

$C_{17}H_{35}O_5Cl_3 = 25.6$ per cent. The chlorine analysis indicates complete reaction of all the hydroxymethyl groups with the ethylene chlorohydrin.

Monohydric alcohols may also be reacted with mixtures of ethers of uni-, bis-, and tris(hydroxymethyl)phenols to yield useful products as follows.

*Example XVIII*

One hundred and twenty-five parts by weight of ethanolamine and fifty parts by weight of toluene were heated to reflux and thirty parts by weight of a mixture of allyloxy-uni-, bis-, and tris(hydroxymethyl)benzenes, with the tris compound present in the amount of over fifty per cent by weight, was added through a dropping funnel and the mixture refluxed for four and one-half hours. The water formed was collected in a take-off trap, and the excess ethanolamine and toluene removed under vacuum with heating to 100° C. The product was a viscous brown syrup.

Nitrogen analysis 7.13 percent, 7.19 per cent.

*Example XIX*

One hundred and twenty-five parts by weight of ethylene chlorohydrin and fifty parts by weight of toluene were heated to reflux and 30 parts by weight of a mixture of allyloxy-, uni-, bis-, and tris(hydroxymethyl)benzene, the major part of which was the tris(hydroxymethyl) derivative and 0.5 part by weight of concentrated hydrochloric acid was added from a dropping funnel. The mixture was refluxed four and one-half hours and the water formed collected in a take-off trap. The product remaining after the removal of excess ethylene chlorohydrin and toluene by vacuum distillation was a light brown mobile liquid, soluble in hydrocarbon solvents.

*Example XX*

To 1,000 parts by weight of a mixture of the allyloxy-uni-, bis-, and tris(hydroxymethyl)benzenes (refractive index, 1.561; viscosity, 1588 c. p. at 25° C.) was added with vigorous stirring 11.9 parts by weight of concentrated hydrochloric acid. To the mixture was added 4,000 parts by weight of butanol and the whole refluxed for one and one-half hours and twenty parts by weight of sodium bicarbonate in eighty parts by weight of water added. The water and excess butanol were then distilled off under a vacuum at up to 100° C. The product, after filtering off the salt formed, was a light brown, mobile liquid, soluble in toluene. The refractive index was 1.5318 and the viscosity 329 c. p. at 25° C.

*Example XXI*

Six hundred parts by weight of a mixture of the allyloxy-, uni-, bis- and tris(hydroxymethyl)benzenes, six parts by weight hydrochloric acid and 2,200 parts by weight of n-butanol were mixed and refluxed for one hour. About 800 parts by weight of butanol were distilled off at atmospheric pressure. Vacuum distillation was used to remove the remainder of the excess butanol and the water formed, the maximum flask temperature being about 115° C. during the distillation. The product was completely miscible with toluene, dichloroethyl ether, chloroform and similar solvents.

*Example XXII*

In the same manner as described in the foregoing examples, a methylol phenyl ether, e. g., 1 - allyloxy - 2,4,6 - tris(hydroxymethyl)benzene may be reacted with ethylene glycol to give derivatives which have reactive functionality due to the presence of residual hydroxyl groups of the ethylene glycol.

*Example XXIII*

About 89 grams of a mixture of the allyl ethers of methylol phenol described in Example XV was mixed with 500 ml. methanol and 3 ml. of concentrated hydrochloric acid. The reaction mixture was refluxed for 16½ hours and thereafter an aqueous sodium carbonate solution was added and the methanol removed by distillation. The residue was diluted with toluene and washed with water. The toluene mixture was then refluxed while at the same time removing the water formed or present during the reaction. When all the water had been removed the product was completely soluble in the hot toluene. The toluene was distilled off under vacuum to leave a viscous brown syrup. This product was filtered to remove salts not removed during the washing operation. Analysis of the final product showed that it contained 18.3% methoxyl. This latter product could be converted to the infusible and insoluble state by heating it to 180° C. for about two hours. A casting was also prepared by heating a sample at 95° C. with 10%, by weight thereof, resorcinol and 1%, by weight, concentrated hydrochloric acid. This gave a clear, brown, infusible and insoluble casting.

It will of course be apparent to those skilled in the art that instead of using the monohydric alcohols employed in the foregoing examples, other alcohols, many examples of which have been given above and in the formulas appearing in the application, may be employed without departing from the scope of the invention. In addition, the molar ratio of the alcohol and the particular methylol phenyl ether employed may also be varied within wide limits. Thus, although it is preferable to employ at least the same number of mols of alcohols as there are hydroxyl groups, that is, methylol groups around the benzene nucleus, it will be apparent that smaller molar amounts of the alcohol may also be used whereby it is possible to obtain derivatives wherein some of the hydroxyl groups will not be replaced with the residue from the alcohol. Thus, on a molar basis, I may use, for example, from about one to three or even as high as six mols or more of the alcohol per mol of the methylol phenyl ether. When the molar ratio of alcohol to methylol group is one or less, there is a greater tendency towards resinification. It is therefore preferable to use high ratios of alcohol to methylol groups, e. g., from 3 to 10 mols of the alcohol per mol of methylol group. The rate of reaction between the alcohol and the methylol group can be followed by determining the amount of water being removed as the reaction proceeds. One mol of water will be formed as each mol of alcohol reacts with a methylol group.

The conditions of reaction for obtaining my claimed reaction products may also be varied and the reaction between the alcohol and the methylol phenyl ether may be carried out at temperatures ranging, for example, from about room temperature to as high as the reflux temperature of the alcohol, i. e., the compound having the formula R'OH where R' has the meaning given above, or higher. Higher boiling alcohols of course will permit the use of higher reaction temperatures, but going to too high a temperature increases the danger of undesirable resinification. These dangers may be minimized by the use of large molar excesses of alcohol.

The claimed compositions of matter are useful as intermediates in the preparation of other materials particularly esters thereof, whereby esterification can take place of the hydroxyl groups of the alcohol residue and of any hydroxyl groups remaining from the original methylol phenyl ether to produce esters which are useful for example as plasticizers for various resins, particularly vinyl halide resins, e. g., polyvinyl chloride, copolymers of vinyl chloride and vinyl acetate. Also my compositions can be used per se as surface coatings by incorporating therein acidic catalysts, e. g., phosphoric acid, etc., and baking them. Such coatings are highly alkaline-resistant. My claimed compositions may also be combined with resins, e. g., polyvinyl acetals, aklyd resins, urea and melamine resins, furfural resins, etc.

Although it is difficult to isolate individual compounds or compositions as a result of the reaction of methylol phenyl ether with the alcohol, the claimed compositions of matter are definite mixtures which can be reproduced at will following essentially the same conditions in each case. Their character and constitution can be determined by ascertaining the number of mols of alcohol which have reacted with the methylol phenyl ether.

What I claim as new and desire to secure by Letters Patent of the United States is:

1. A composition of matter comprising the product of reaction of a mixture of ingredients comprising (1) a methylol phenyl ether corresponding to the general formula

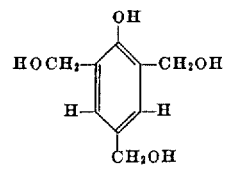

and (2) an alcohol corresponding to the general formula

R'OH where R and R' each represents a member of the class consisting of hydrocarbon aliphatic, cycloaliphatic, aryl-substituted aliphatic radicals, and halogen-substituted derivatives of the aforesaid hydrocarbon aliphatic radicals, and R' in addition, represents a member of the class consisting of hydroxy-substituted and amino-substituted hydrocarbon aliphatic radicals.

2. A composition of matter comprising the product of reaction of a mixture of ingredients comprising (1) a mixture of methylol phenyl ethers comprising (a) a methylol phenyl ether corresponding to the general formula

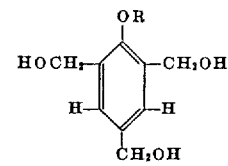

and (b) a mixture of methylol phenyl ethers corresponding to the general formula

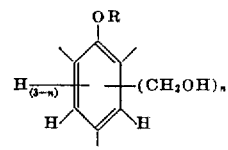

and (2) an alcohol corresponding to the general formula

R'OH where R and R' each represents a member of the class consisting of hydrocarbon aliphatic, cycloaliphatic, aryl-substituted aliphatic radicals, and halogen-substituted derivatives of the aforesaid hydrocarbon aliphatic radicals, and R' in addition, represents a member of the class consisting of hydroxy-substituted and amino-substituted hydrocarbon aliphatic radicals, and $n$ is an integer equal to from 1 to 2.

3. A composition of matter comprising the product of reaction of a mixture of ingredients comprising (1) a methylol phenyl ether corresponding to general formula

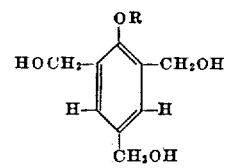

where R represents a member selected from the class consisting of hydrocarbon aliphatic, cycloaliphatic, aryl-substituted aliphatic groups, and halogen-substituted derivatives of the aforesaid hydrocarbon aliphatic groups, and (2) n-butanol.

4. A composition of matter comprising the product of reaction of a mixture of ingredients comprising (1) a methylol phenyl ether corresponding to general formula

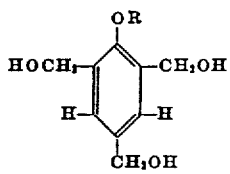

where R represents a member selected from the class consiting of hydrocarbon aliphatic, cycloaliphatic, aryl-substituted aliphatic groups, and halogen-substituted derivatives of the aforesaid hydrocarbon aliphatic groups, and (2) ethylene chlorohydrin.

5. A composition of matter comprising the product of reaction of a mixture of ingredients comprising (1) a methylol phenyl ether corresponding to general formula

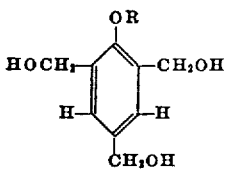

where R represents a member selected from the class consiting of hydrocarbon aliphatic, cycloaliphatic, aryl-substituted aliphatic groups, and halogen-substituted derivatives of the aforesaid hydrocarbon aliphatic groups, and (2) ethanolamine.

6. A composition of matter comprising the product of reaction of a mixture of ingredients comprising (1) a methylol phenyl ether corresponding to general formula

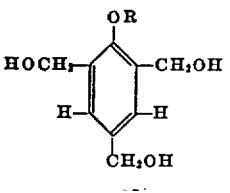

where R represents a member selected from the class consisting of hydrocarbon aliphatic, cycloaliphatic, aryl-substituted aliphatic groups, and halogen-substituted derivatives of the aforesaid hydrocarbon aliphatic groups, and (2) ethylene glycol.

7. A composition of matter comprising the product of reaction of a mixture of ingredients comprising (1) 1 - allyloxy - 2,4,6 - tris(hydroxymethyl)benzene and (2) n-butanol.

8. A composition of matter comprising the product of reaction of a mixture of ingredients comprising (1) 1 - allyloxy - 2,4,6 - tris(hydroxymethyl)benzene and (2) ethylene chlorohydrin.

9. A composition of matter comprising the product of reaction of a mixture of ingredients comprising (1) 1 - allyloxy - 2,4,6 - tris(hydroxymethyl)benzene and (2) ethanolamine.

10. A composition of matter comprising the product of reaction of a mixture of ingredients comprising (1) 1 - allyloxy - 2,4,6 - tris(hydroxymethyl)benzene and (2) ethylene glycol.

11. A composition of matter comprising the product of reaction of a mixture of ingredients comprising (1) 1 - methoxy - 2,4,6 - tris(hydroxymethyl)benzene and (2) n-butanol.

ROBERT W. MARTIN.

REFERENCES CITED

The following references are of record in the file of this patent:

UNITED STATES PATENTS

| Number | Name | Date |
|---|---|---|
| 1,754,677 | Hahl | Apr. 15, 1930 |
| 2,495,232 | Drisch et al. | Jan. 24, 1950 |

Certificate of Correction

Patent No. 2,606,929                                                              August 12, 1952

ROBERT W. MARTIN

It is hereby certified that error appears in the printed specification of the above numbered patent requiring correction as follows:

Column 4, line 25, for "7.73" read *1.73*; column 12, lines 3 to 9, for that portion of the formula reading

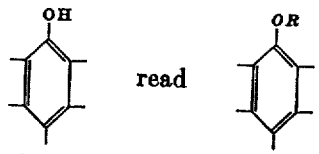

line 52, after the word "addition" strike out the comma; column 13, line 29, for "consiting" read *consisting*;

It is hereby certified that error appears in the printed specification of the same may conform to the record of the case in the Patent Office.

Signed and sealed this 14th day of July, A. D. 1953.

[SEAL]

THOMAS F. MURPHY,
*Assistant Commissioner of Patents.*